April 21, 1964  G. V. MORRIS  3,130,336
UNIT WOUND GENERATOR STATOR
Filed Jan. 19, 1951
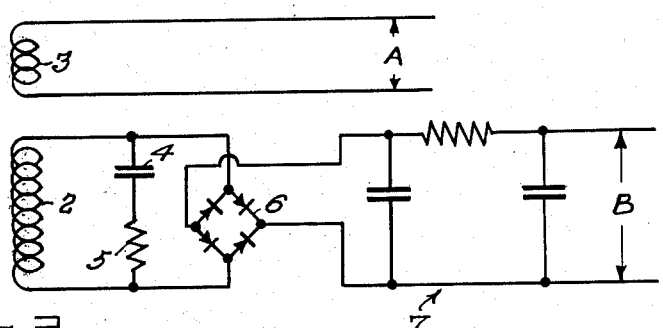
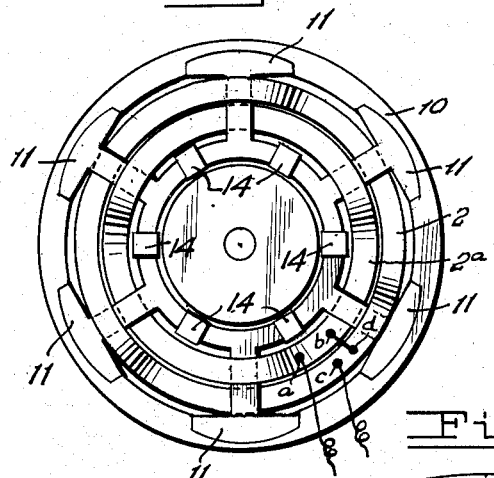
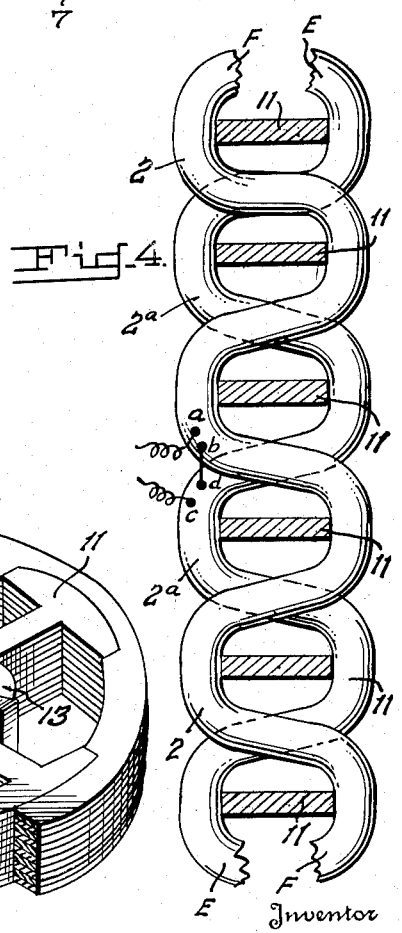
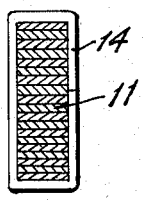
Inventor
George V. Morris
By G. J. Kessenich, J. H. Church, M. L. Libman
Attorneys United States Patent Office 3,130,336
Patented Apr. 21, 1964

3,130,336
UNIT WOUND GENERATOR STATOR
George V. Morris, Chicago, Ill., assignor to the United States of America as represented by the Secretary of the Army
Filed Jan. 19, 1951, Ser. No. 206,758
3 Claims. (Cl. 310—254)

This invention relates to an improved stator construction for small A.C. generators and has for its primary object to provide an efficient and inexpensive generator of the smallest possible weight and size for a given power output. Generators of the above type are useful in connection with air-driven power supplies for electronic equipment on airborne missiles or projectiles.

Another object is to provide a compact power supply energized by wind-turbine or other variable speed source of mechanical power and capable of good speed-voltage regulation.

The specific nature of the invention as well as other objects and advantages thereof will clearly appear from a description of a preferred embodiment as shown in the accompanying drawings, in which, FIG. 1 is a schematic drawing of a power-supply comprising a generator according to the present invention and a voltage regulating network.

FIG. 2 is a schematic end view of a generator constructed in accordance with the present invention.

FIG. 3 is a perspective view, partly broken away, of the magnetic structure of the stator shown in FIG. 2.

FIG. 4 is a developed view of the stator winding.

FIG. 5 is a sectional view taken on line 5—5 of FIG. 3.

Referring to FIG. 1, the rotor 1, carrying a suitable permanent magnetic field structure (as will be described hereinafter in more detail) induces a voltage in stator winding 2. A second winding 3 may be interwound with winding 2 where a separate "A" or low voltage supply is required, this winding having, of course, fewer turns than winding 2. A regulating network consisting of condenser 4 and resistance 5 is shunted across the winding 2. A conventional full-wave rectifier 6 and a filter network 7 are employed where the output of winding 2 is used as the "B" supply for an electronic circuit.

The value of condenser 4 and resistance 5 are so chosen as to load the generator only slightly to the threshold operating frequency (or speed), which in a typical case is several thousand r.p.m. and the speed range for one type of use to which this equipment is suited may be from the threshold speed up to twice that speed. It is therefore desired to secure a fairly uniform voltage output over this wide range of speed in order to insure proper operation of the associated electronic equipment. Such electronic equipment typically represents a fairly constant load. The combination of 4 and 5 will load the generator increasingly with increasing frequency from the threshold frequency up to the highest operating frequency. In order to avoid over-regulation, the value of capacity 4 must not be too great and of resistance 2 must not be too small, but they must be matched to the impedance of the generator. The filament winding 3, if one is employed, is regulated by reaction from the high voltage winding 2, since the two windings are loosely coupled with an iron core in common.

In any practical generator of the type above described there will be a certain amount of flux leakage, as is well understood. While leakage permeance contributes no power producing flux linkages, it is a factor in the total generator impedance, and is as effective as rotor permeance in increasing the rate at which current constancy is approached with rising frequency.

In order to achieve a compact power supply with good regulation, of the type shown in FIG. 1, I have found it desirable to have a higher leakage reactance than straight-forward design would produce. This is overcome by the construction of FIG. 2, wherein an outer ring 10, built up of a number of stacked laminations, provides the main magnetic return path for flux in the windings 2, 3 which are the same as in FIG. 1. Each of these windings is in the form of a single circular coil bent alternately back and forth around salient poles 11 in serpentive fashion. Alternatively, and preferably, two such coils may be used for each winding, oppositely wound on the respective poles to give a better space factor, the two coils being connected in series as shown in FIGS. 2 and 4.

FIG. 2 shows how two oppositely wound coils 2 and 2a may be arranged, with one terminal of each coil (b, d) connected to a corresponding terminal of the other coil so that the induced currents in the coils will be in series aiding, while the two free terminals (a, c) serve as output terminals of the whole winding.

FIG. 4 is a schematic developed view showing the relationship of the coils. It will be understood that bottom point E of coil 2a is the same point as the top E; similarly point F of coil 2 is represented at the ends of this coil as developed, but is actually the same single point on the circular winding.

The salient poles, shown as 6 in number are integrally formed with a thin inner ring 13, and are also built of stacked-up laminations. After they are thus stacked up and shellacked or otherwise fastened together, the coils are wound on them; or the coils may be pre-wound and slipped on over the poles (in which case the winding must be somewhat loose). Thereafter, the outside stator ring 10 is pressed over the projecting poles 11 to complete the flux path from the poles.

Between each of the inner pole tips of the salient poles, where they are bridged by the inner ring 13, a high conductivity copper coil or band 14 is placed around the bridge element. The reaction of the current induced in these copper rings serves to increase the leakage reactance between the adjacent pole tips to a value much higher than would otherwise be the case. The copper bands are, in practice, put on the stacked-up laminations before the winding.

It will be apparent that the embodiments shown are only exemplary and that various modifications can be made in construction and arrangement within the scope of my invention as defined in the appended claims.

I claim:

1. A generator stator for use with a rotating magnetic field member, comprising a ring-shaped outer yoke member of magnetic material, a ring-shaped inner bridge member of magnetic material having an inner cylindrical surface, a plurality of pole pieces integral with said inner bridge member and extending radially into contact with said outer yoke member, armature windings connected in series on said pole pieces, and a plurality of bands of highly conductive material each disposed about said bridge member between two adjacent pole members to increase the leakage reactance between the adjacent poles.

2. The invention according to claim 1, wherein said outer yoke member, pole pieces and inner bridge members are built up of stacked laminations.

3. The invention according to claim 2, wherein said windings comprise two coils of serpentive form passing alternately to one side and to the other of adjacent poles, the two coils passing on opposite sides of any given pole.

References Cited in the file of this patent
UNITED STATES PATENTS

| | | |
|---|---|---|
| 2,501,222 | Hybler | Mar. 21, 1950 |
| 2,607,816 | Ryder et al. | Aug. 19, 1952 |
| 2,687,482 | Harmon et al. | Aug. 24, 1954 |